(12) United States Patent
Ogawa

(10) Patent No.: US 7,301,574 B2
(45) Date of Patent: Nov. 27, 2007

(54) CHARGE COUPLED DEVICE FOR OUTPUTTING IMAGE DATA

(75) Inventor: Yoshimasa Ogawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 725 days.

(21) Appl. No.: 09/775,639

(22) Filed: Feb. 5, 2001

(65) Prior Publication Data

US 2001/0030705 A1    Oct. 18, 2001

(30) Foreign Application Priority Data

Apr. 12, 2000  (JP) ............................. 2000-111309

(51) Int. Cl.
*H04N 3/14*    (2006.01)
*H04N 5/335*   (2006.01)

(52) U.S. Cl. ...................... 348/311; 348/294; 348/321; 257/232; 250/208.1

(58) Field of Classification Search ............... 348/250, 348/294, 303, 311, 316, 317, 319–323; 257/232; 250/208.1

See application file for complete search history.

(56) References Cited

U.S. PATENT DOCUMENTS

| | | | | |
|---|---|---|---|---|
| 4,500,915 A | * | 2/1985 | Koike et al. | 348/283 |
| 4,785,353 A | * | 11/1988 | Seim | 348/241 |
| 5,291,294 A | * | 3/1994 | Hirota | 348/316 |
| 5,317,408 A | * | 5/1994 | Hirota | 348/315 |
| 5,426,317 A | * | 6/1995 | Hirota | 348/250 |
| 5,539,536 A | * | 7/1996 | Maki et al. | 348/311 |
| 5,625,412 A | * | 4/1997 | Aciu et al. | 348/222.1 |
| 5,650,352 A | * | 7/1997 | Kamasz et al. | 438/60 |
| 5,818,524 A | * | 10/1998 | Juen | 348/231.99 |
| 5,969,759 A | * | 10/1999 | Morimoto | 348/311 |
| 6,304,292 B1 | * | 10/2001 | Ide et al. | 348/243 |

* cited by examiner

*Primary Examiner*—Lin Ye
*Assistant Examiner*—Gevell Selby
(74) *Attorney, Agent, or Firm*—Staas & Halsey LLP

(57) ABSTRACT

A solid-state imaging element comprising a plurality of light-receiving sensors that convert optical signals into electrical signals and a memory storing the electrical signals. The memory is formed of a plurality of line buffers corresponding to the pixel units processed in an image data encoder. The solid-state imaging element eliminates the need to rearrange image data for encoding.

8 Claims, 16 Drawing Sheets

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |
| 81 | 82 | 83 | 84 | 85 | 86 | 87 | 88 | 89 | 90 |
| 91 | 92 | 93 | 94 | 95 | 96 | 97 | 98 | 99 | 100 |

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

FIG. 3B
(PRIOR ART)

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

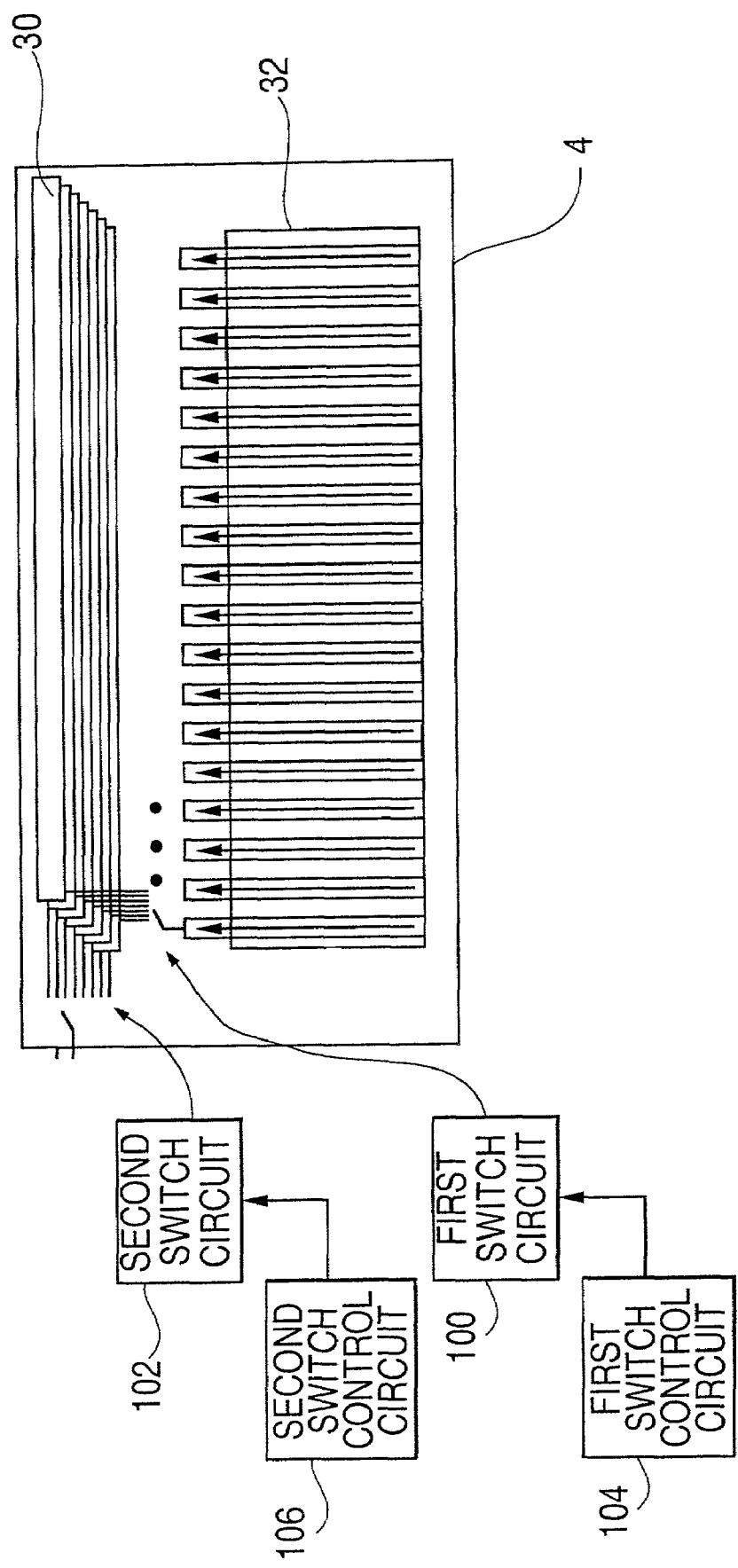

FIG. 8B

BLOCK1 BLOCK2 BLOCK3 BLOCK4 BLOCK5

| 1 | 2 | 3 | 4 | 5 | 6 | 7 | 8 | 9 | 10 | — 120 |
|---|---|---|---|---|---|---|---|---|---|---|
| 11 | 12 | 13 | 14 | 15 | 16 | 17 | 18 | 19 | 20 | — 122 |
| 21 | 22 | 23 | 24 | 25 | 26 | 27 | 28 | 29 | 30 | — 124 |

FIG. 8A

| 1 | 2 | 3 | 4 | 5 | 6 | 7 | 8 | 9 | 10 |
|---|---|---|---|---|---|---|---|---|---|
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |
| 81 | 82 | 83 | 84 | 85 | 86 | 87 | 88 | 89 | 90 |
| 91 | 92 | 93 | 94 | 95 | 96 | 97 | 98 | 99 | 100 |

32

CHARGE COUPLED DEVICE FOR OUTPUTTING IMAGE DATA

BACKGROUND OF THE INVENTION

1. Field of the Invention

The present invention relates to a solid-state imaging element for inputting optical image data and then converting this data into an electrical signal, and an image input device using this same solid-state imaging element.

2. Description of the Related Art

In an image input device such as a digital camera, as illustrated in FIG. 1, optical image data transmitted through a lens 2 are input to a CCD (Charge Coupled Device) 4, which is a solid-state imaging element. In the CCD 4, the input image data are converted to an electrical signal, that is, to analog image data. The analog image data are converted to digital image data by an A/D converter 6 and the digital image data are stored in a frame memory 8. The digital image data stored in the frame memory 8 are then supplied to an image data encoder 10 comprising, for example, a discrete cosine transform (DCT) converting unit 12, a quantizing unit 14, and a Huffman encoding unit 16, or the like, and the image data are compressed through the encoding process.

As illustrated in FIG. 2, CCD 4 comprises a horizontal CCD section 30 and a vertical CCD section 32. In the vertical CCD section 32, photosensors 34, such as photodiodes, are arranged such that the photosensors 34 correspond to the pixels of a frame image. Each photosensor 34 receives the images corresponding to one pixel and converts an optical beam into a voltage to generate analog image data.

The horizontal CCD section 30 includes line buffers for outputting the analog image data. The analog image data corresponding to one pixel generated in each photosensor 34, are shifted stage by stage in the vertical direction (from a to b) and are then input to the line buffer that holds the analog image data of one line. The line buffer holding the analog image data of one line, shifts the analog image data one-by-one in the horizontal direction (from c to d) and outputs the data to an external circuit of the CCD 4. The analog image data output from the CCD 4 are then input to an A/D converter 6. The analog image data are converted to digital image data by the A/D converter 6 and then transferred to the image data encoder 10 and compressed through the encoding process.

In the image data encoder 10, the image data are divided and processed in predetermined units (hereinafter, referred to as blocks). As illustrated in FIG. 3A, for example, in JPEG image encoding, the image data are encoded as an 8×8 array or block of pixels. In each block, the image data are often processed in a sequence from upper left to lower right, as illustrated in FIG. 3B.

In FIG. 4, one block 52 comprises an 8×8 array of pixels (refer to FIG. 3A). As illustrated in FIG. 4, the image data of one frame 50 (the layout of the image data is identical to the layout in the vertical CCD 32) are divided into n blocks, and the encoding process is executed in the sequence 1, 2, . . . , n.

In the CCD 4, the image data of one frame 50 are output for each line as illustrated in FIG. 2. Meanwhile, in the image data encoder 10, which receives the data from the CCD 4 and then encodes the data, the encoding process is performed in predetermined units of a block as illustrated in FIG. 4. Therefore, the image data output from the CCD 4 must be rearranged to a layout suitable for the encoding process. Rearrangement may be conducted by the operations explained below.

(1) Operation using RAM:

In the first approach, as illustrated in FIG. 5, the image data output from the CCD 4 are written into RAM 70 and input to the image data encoder 10 via the RAM 70. When executing the encoding process in the image data encoder 10, address conversion is conducted and the data are read in the sequence required for the encoding process.

(2) Operation using line buffers:

In the second approach, as illustrated in FIG. 6A, the image data output from the CCD 4 are input to the image data encoder 10 via an 8-line buffer 90 (or a 16-line buffer in the case of a double buffer). As illustrated in FIG. 6B, the data of an 8-line CCD 4 are read into the line buffer 90. As illustrated in FIG. 6C, data are read in units of 8 pixels from the line buffer 90.

However, reading data using the rearrangement processes explained above has the following problems.

First, RAM is expensive and occupies a large area. Therefore, the number of RAMs used must be controlled. Often, only one RAM is used in common for various purposes. In this case, when a RAM is used for only one purpose, application to other purposes is prevented. Accordingly, access control for multiple applications is rather complicated. Moreover, when a single RAM is being used for other applications, image data cannot be read. Therefore, it is impossible to realize a high-speed encoding process for image data. In addition, address conversion is complicated.

Second, line buffers must be prepared for reading image data. Because a line buffer is used exclusively for one operation, it cannot be used in common with another operation.

SUMMARY OF THE INVENTION

In view of the above, the present invention provides a solid-state imaging element comprising a plurality of light receiving sensors for converting optical image data into electrical signals and a memory for storing the electrical signals, wherein the memory contains a plurality of line buffers.

In particular, the solid-state imaging element comprises a plurality of L (L is a positive integer) light receiving sensors arranged in one line for converting optical image data into an electrical signal and a memory for storing the electrical signal, wherein the memory contains a plurality of buffers, each holding m pixels of data. An image processor having such a solid-state image element is also provided.

According to the solid-state imaging element and image processor of the present invention, the image data output from a CCD 4 can be provided, without being rearranged, to an image data encoder 10, eliminating the need for a RAM or an exclusive line buffer for rearranging image data. Therefore the transfer process may be simplified, the physical size of the circuit structure may be reduced, and high-speed image data transfer may be realized.

These together with other objects and advantages that will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3A is a diagram of image data for an 8×8 block of pixels.

FIG. 3B is a diagram of the sequence of processing for the image data of FIG. 3A.

FIG. 7 is a diagram of a first embodiment of the present invention.

FIG. 8A is a diagram of a vertical CCD.

FIG. 8B is a diagram of a vertical CCD and line buffers.

DESCRIPTION OF THE PREFERRED EMBODIMENTS

Figure 1:
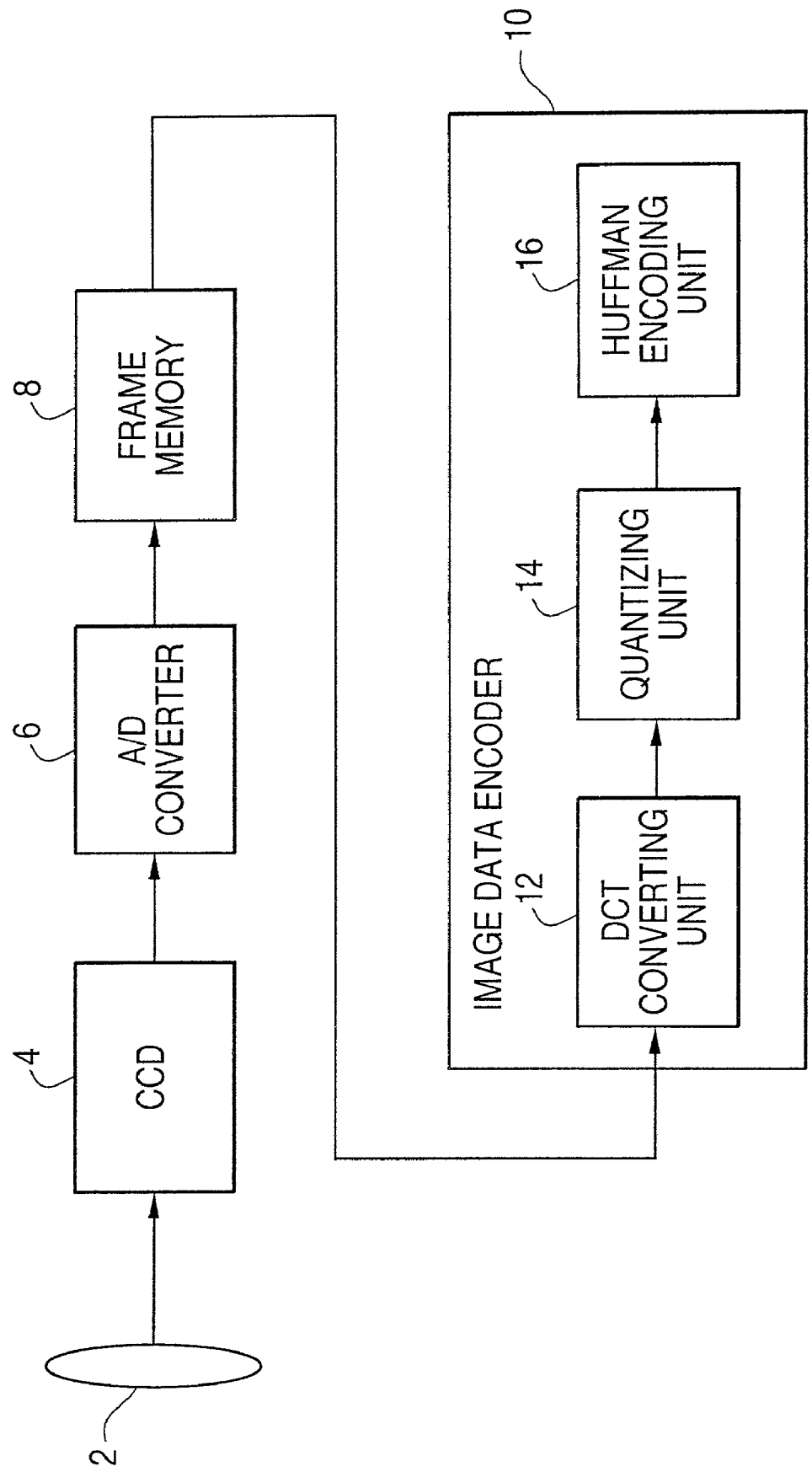
FIG. 1 is a block diagram of an image input device.
Figure 2:
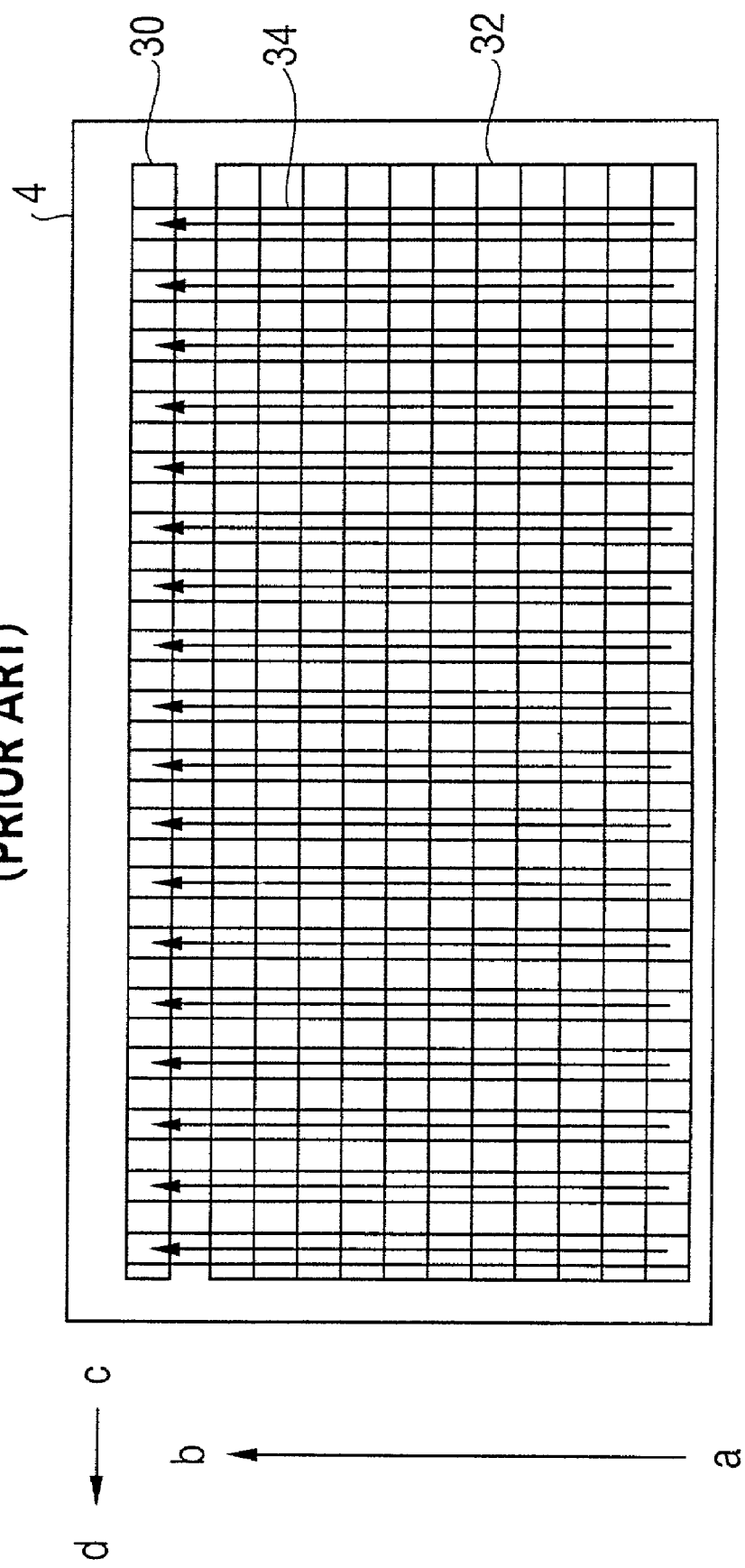
FIG. 2 is a diagram of a CCD.
Figure 4:
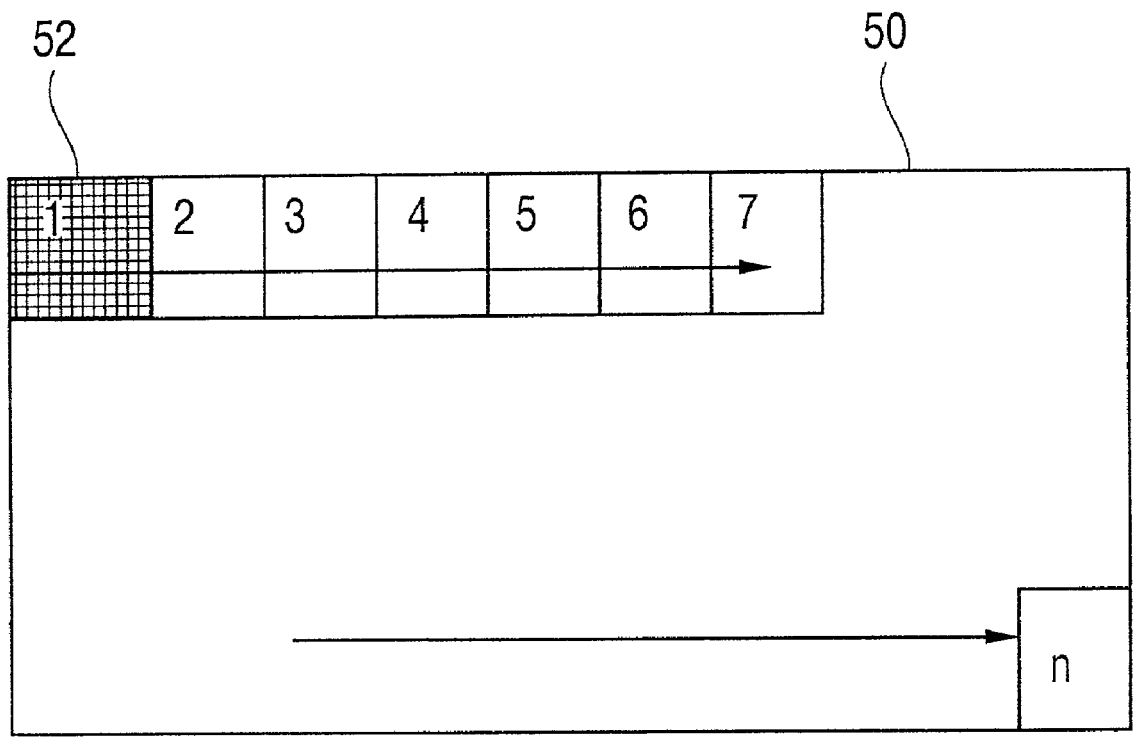
FIG. 4 is a diagram of image data for one frame.
Figure 5:
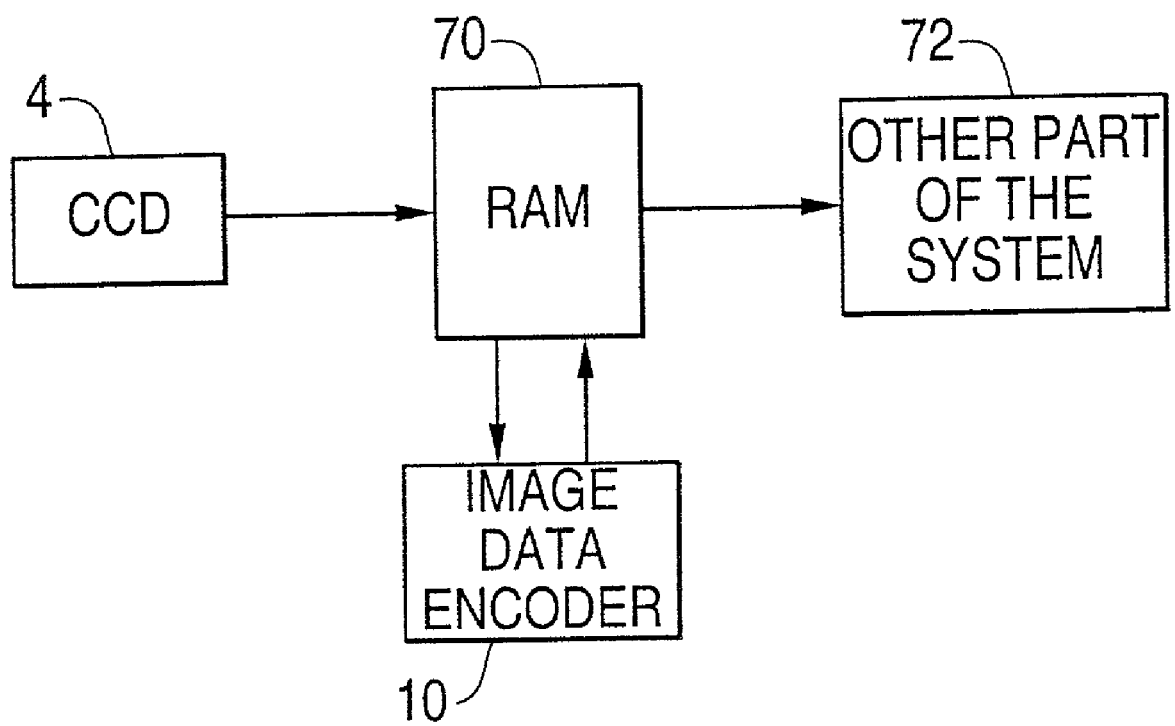
FIG. 5 is a diagram showing the use of RAM in the rearrangement of image data.
Figure 6A:
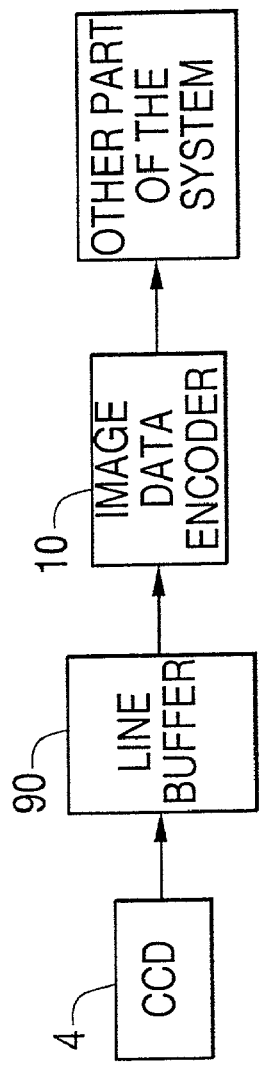
FIG. 6A is a diagram showing the use of a line buffer in the rearrangement of image data.
Figure 6B:
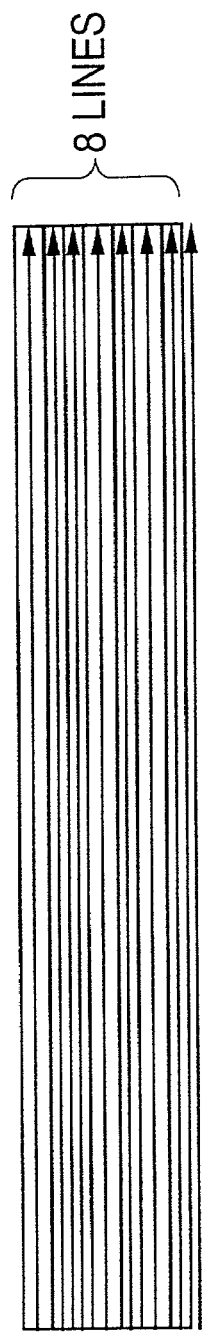
FIG. 6B is also a diagram showing the use of a line buffer in the rearrangement of image data.
Figure 6C:
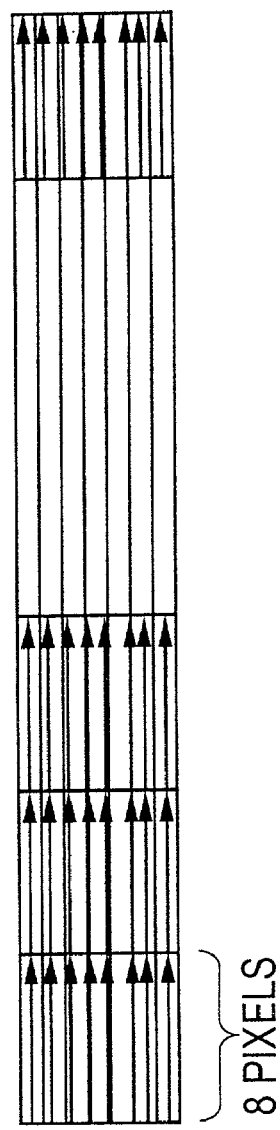
FIG. 6C is another diagram showing the use of a line buffer in the rearrangement of image data.

FIG. 7 is a diagram of a first embodiment of the present invention. The CCD 4 of FIG. 7 comprises, like the CCD 4 of FIG. 2, a horizontal CCD 30 and a vertical CCD 32. However, the horizontal CCD 30 illustrated in FIG. 7 comprises a number of line buffers corresponding to the number of horizontal lines required for image data processing. For example, n line buffers are provided for image data that are encoded in the image data encoder 10 in an n×m block (vertical×horizontal) of pixels.

The CCD 4 illustrated in FIG. 7 also comprises a first switch circuit 100, a second switch circuit 102, a first switch control circuit 104, and a second switch control circuit 106. The first switch circuit 100 connects to each vertical line of the vertical CCD 32. The first switch control circuit 104 controls the first switch circuit 100 so that only one of the plurality of line buffers of the horizontal CCD 30 connects to the vertical CCD 32. The second switch control circuit 106 controls the second switch circuit 102 so that only one of the plurality of line buffers of the horizontal CCD 30 connects to an external circuit (not illustrated).

The operation for outputting image data from the CCD 4 illustrated in FIG. 7 is explained below with reference to FIGS. 8A and 8B. In the embodiment shown in FIG. 8A, 100 pixels are contained in a 10×10 array of image data. FIGS. 8A and 8B illustrate an example of how image data are stored in the vertical CCD 32 and the line buffers 120-124. In FIGS. 8A and 8B, it is assumed that the image data encoder 10 performs the encoding process on units of 3×2 blocks (vertical×horizontal) of pixel data. Therefore, three line buffers are used.

The image data are first transferred in the vertical direction. The first switch control circuit 104 controls the first switch circuit 100 to connect the first line buffer 120 and the vertical CCD 32. The image data corresponding to one horizontal line are transferred to the first line buffer 120 from the vertical CCD 32. Next, the first switch control circuit 104 controls the first switch circuit 100 to connect the second line buffer 122 and the vertical CCD 32. The image data of the next horizontal line are transferred to the second line buffer 122 from the vertical CCD 32. As explained above, the first switch control circuit 104 switches the connections of the first switch circuit 100 until all the line buffers are filled with image data.

The image data corresponding to three horizontal lines are transferred to the line buffers, from the vertical CCD 32 shown in FIG. 8A. FIG. 8B illustrates the condition where all the buffers are filled with the image data of vertical CCD 32.

Next, the image data are transferred in the horizontal direction. Transfer in the horizontal direction is performed after the image data are supplied to all of the n line buffers. The second switch control circuit 106 controls the second switch circuit 102 to connect the first line buffer 120 and an external circuit of the CCD 4. The image data of m pixels are output to the external circuit of the CCD 4 from the first line buffer 120. Next, the second switch control circuit 106 controls the second switch circuit 102 to connect the second line buffer 122 and the external circuit of the CCD 4. The image data of m pixels are output to the external circuit of the CCD 4 from the second line buffer 122. The image data of n line buffers are output to the external circuit of the CCD 4 by repeating similar output operations.

FIG. 8B is explained in more detail below. The second switch control circuit 106 controls the second switch circuit 102 to connect the first line buffer 120 and the external circuit of the CCD 4. The first line buffer 120 outputs the image data (pixels 1 and 2) to the external circuit of the CCD 4. Next, the second switch control circuit 106 controls the second switch circuit 102 to connect the second line buffer 122 and the external circuit of the CCD 4. The second line buffer 122 outputs the image data (pixels 11 and 12) to the external circuit of the CCD 4. Then, the second switch control circuit 106 controls the second switch circuit 102 to connect the third line buffer 124 to the external circuit of the CCD 4. The third line buffer 124 outputs the image data (pixels 21 and 22) to the external circuit of the CCD 4. As explained above, this results in output of the image data of block 1. By repeating similar output operations, the image data of block 1 to block 5 are sequentially output.

By repeating transfer in the vertical and horizontal directions, the image data of one frame are output completely. That is, the image data from the first to the one-hundredth pixel of the vertical CCD 32 of FIG. 8A are all output.

Figure 9:
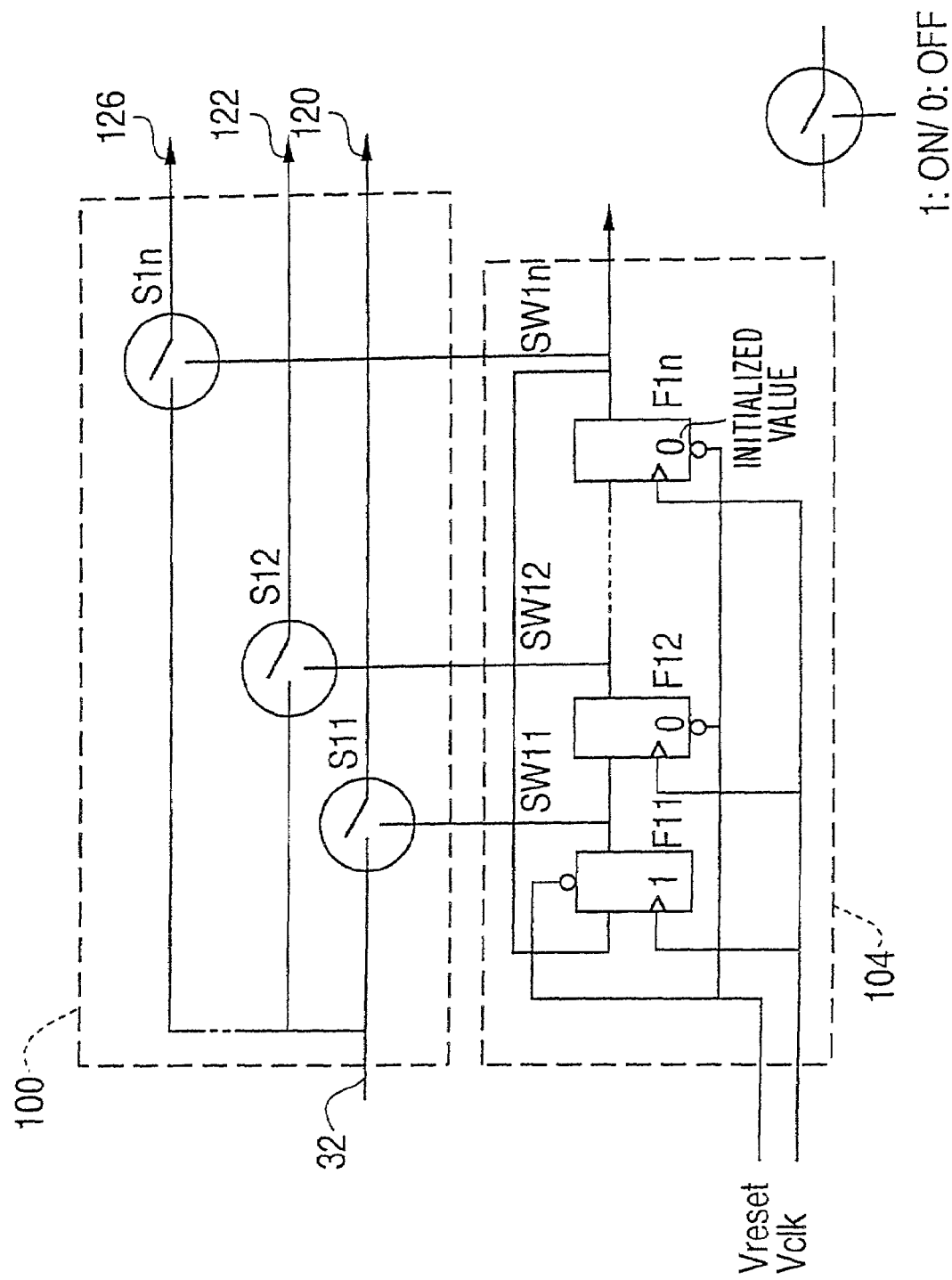
FIG. 9 is a diagram of a first switch circuit and a first switch control circuit.

FIG. 9 is a circuit diagram of the first switch circuit 100 and the first switch control circuit 104. The first switch circuit 100 connects one vertical line of the vertical CCD 32 and the storage area of one line buffer (hereinafter referred to as "storage area"). This first switch circuit 100 connects to each vertical line of the vertical CCD 32. In FIG. 9, it is assumed that the first switch circuit 100 connects to the first vertical line of the vertical CCD 32. A switch S11 connects the first vertical line of the vertical CCD 32 and the first storage area of the first line buffer 120. A switch S12 connects the first vertical line of the vertical CCD 32 and the first storage area of the second line buffer 122. A switch S1n connects the first vertical line of the vertical CCD 32 and the first storage area of the nth line buffer 126.

The switches S1 to S1n are controlled by the first switch control circuit 104. The first switch control circuit 104 comprises a shift register having n flip-flop (FF) circuits. An output SW11 of the first flip-flop F11 controls the ON/OFF condition of the switch S11. An output SW12 of the second flip-flop F12 controls the ON/OFF condition of the switch S12. An output SW1n of the nth flip-flop F1n controls the ON/OFF condition of the switch S1n.

A reset signal $V_{reset}$ is input to the flip-flops F11 to F1n to initialize the flip-flop circuits. The flip-flop F11 is initialized with the signal "1", while the other flip-flop circuits are initialized with the signal "0". Also, a vertical direction shift pulse $V_{CLK}$ is supplied to the flip-flop circuits F11 to F1n.

Figure 10:
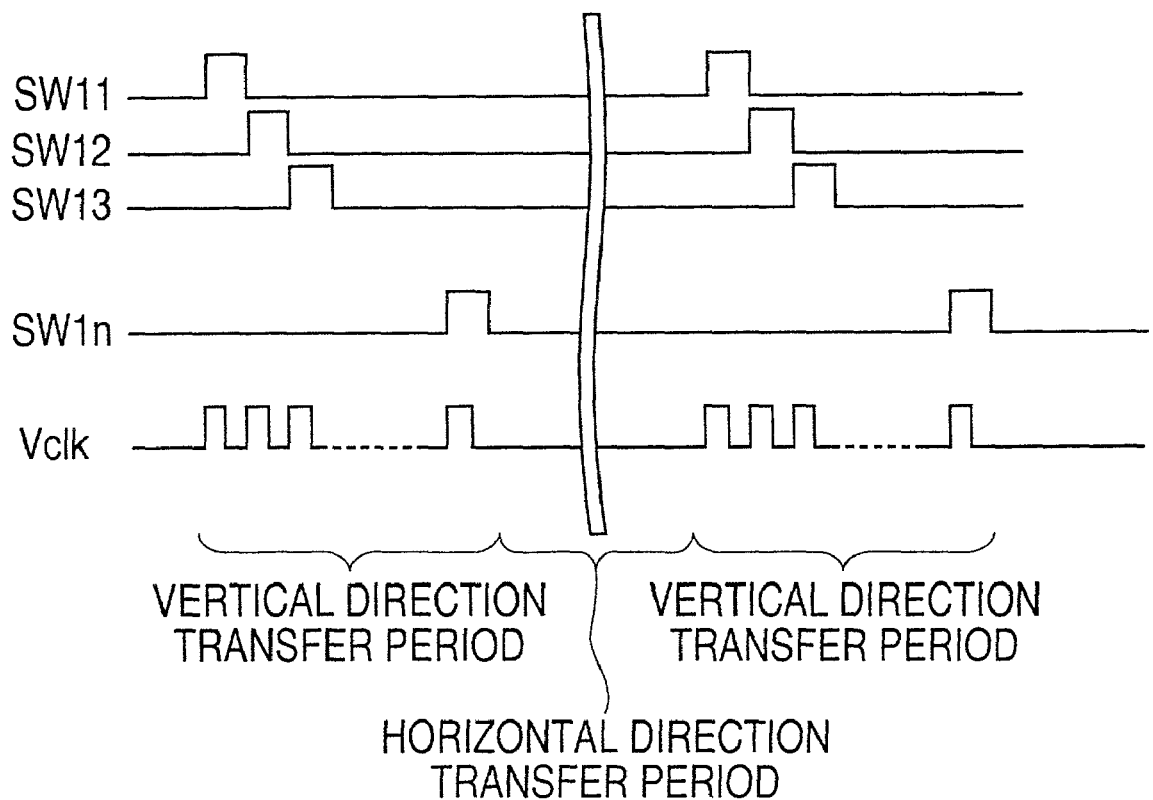
FIG. 10 is a diagram of a timing chart for the vertical direction transfer period.

FIG. 10 is a timing chart illustrating the operations of the first switch circuit 100 and first switch control circuit 104 of FIG. 9 during the transfer in the vertical direction. A first shift pulse occurs when the flip-flop F11, initialized with the signal "1", outputs a "1" for control signal SW11. The other flip-flop circuits, initialized with the signal "0", output a "0" for the control signals SW12 to SW1n. Therefore, the switch S11 turns ON to transfer the image data of the first horizontal line of the vertical CCD 32 to the storage area of the first line buffer 120. Each flip-flop receives the signal output from the preceding flip-flop circuit.

A second shift pulse occurs when the flip-flop F12, having received the output signal "1" from the flip-flop F11, outputs a "1" for the control signal SW12. The other flip-flop circuits that have received the output signal "0" from the flip-flop of the preceding stage output a "0" for the control signal SW11 and the control signals SW13 to SW1n. Therefore, the switch S12 turns ON to transfer the image data of the second horizontal line of the vertical CCD 32 to the storage area of the second line buffer 122. Each flip-flop again receives the signal output from the preceding flip-flop. When the third shift pulse occurs, a third switch turns ON to transfer the image data of the third horizontal line of the vertical CCD 32 to the storage area of the third line buffer 124.

The operations above are repeated for n shift pulses and the image data for n horizontal lines of the vertical CCD 32 are stored in the n line buffers. Thereafter, the horizontal transfer period occurs to transfer the image data from the line buffers to the external circuit of the CCD 4. During the horizontal transfer period, shift pulses in the vertical direction are not present.

Figure 11:
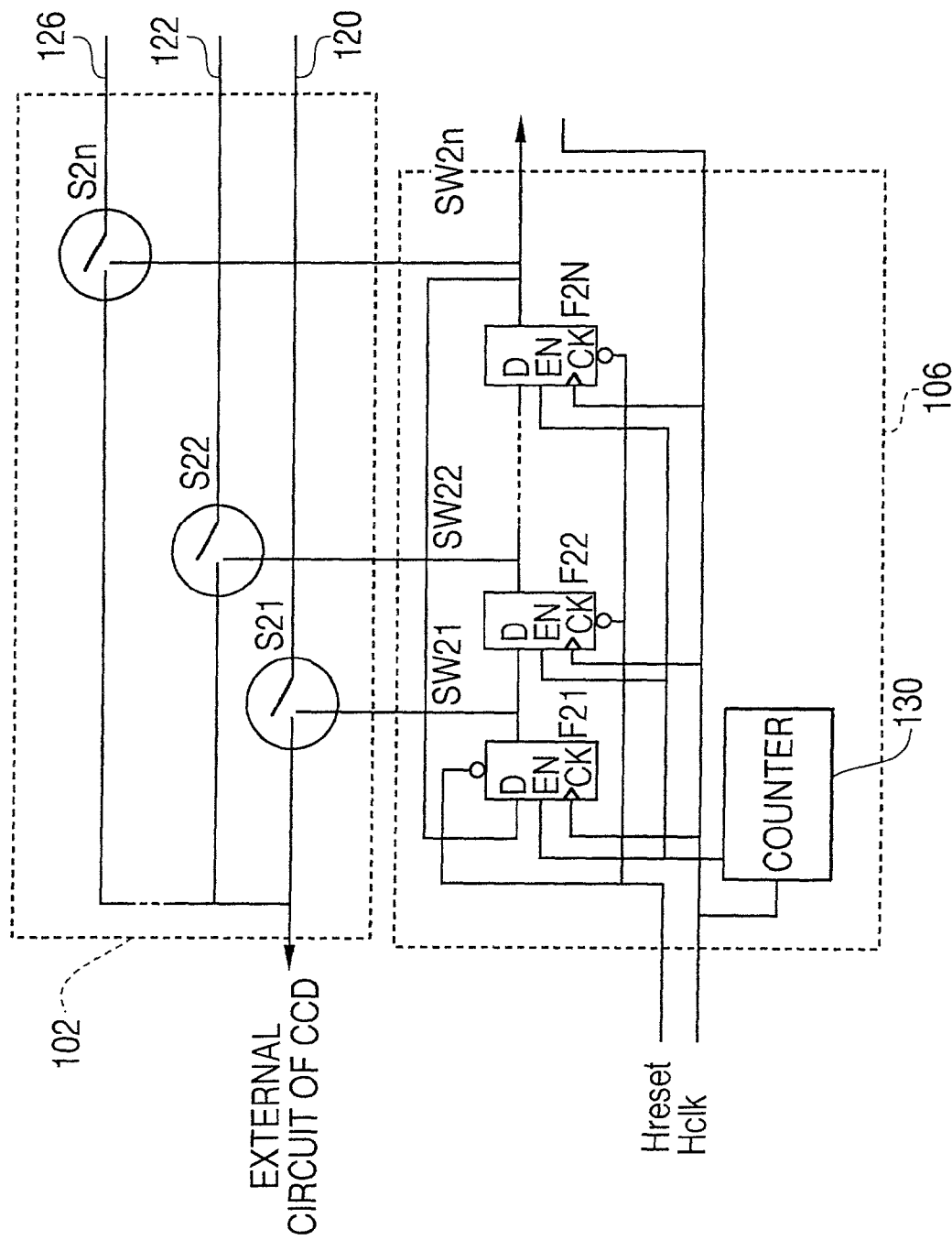
FIG. 11 is a diagram of a second switch circuit and a second switch control circuit.

FIG. 11 is a circuit diagram of the second switch circuit 102 and the second switch control circuit 106. The second switch circuit 102 connects one of the line buffers of the horizontal CCD 30 and the external circuit. The switch S21 connects the first line buffer 120 and the external circuit. The switch S22 connects the second line buffer 122 and the external circuit. The switch S2n connects the nth line buffer 126 and the external circuit.

The switches S21 to S2n are controlled by the second switch control circuit 106. The second switch control circuit 106 comprises a shift register having n flip-flop (FF) circuits and a counter 130. An output SW21 of the first flip-flop F21 controls the ON/OFF condition of the switch S21. An output SW22 of the second flip-flop F22 controls the ON/OFF condition of the switch S22. An output SW2n of the nth flip-flop F2n controls the ON/OFF condition of the switch S2n.

The reset signal $H_{reset}$ is input to the flip-flop circuits F21 to F2n for initialization. The flip-flop F21 is initialized with the signal "1", while the other flip-flops are initialized with the signal "0". Also, the horizontal direction shift pulse $H_{CLK}$ is input to the flip-flop circuits F21 to F2n. The horizontal direction shift pulse $H_{CLK}$ is input to the counter 130. The counter 130 counts the number of horizontal direction shift pulses $H_{CLK}$ (up to m pulses) and supplies the enable signal EN to the flip-flop F2n beginning with the flip-flop F21.

Figure 12:
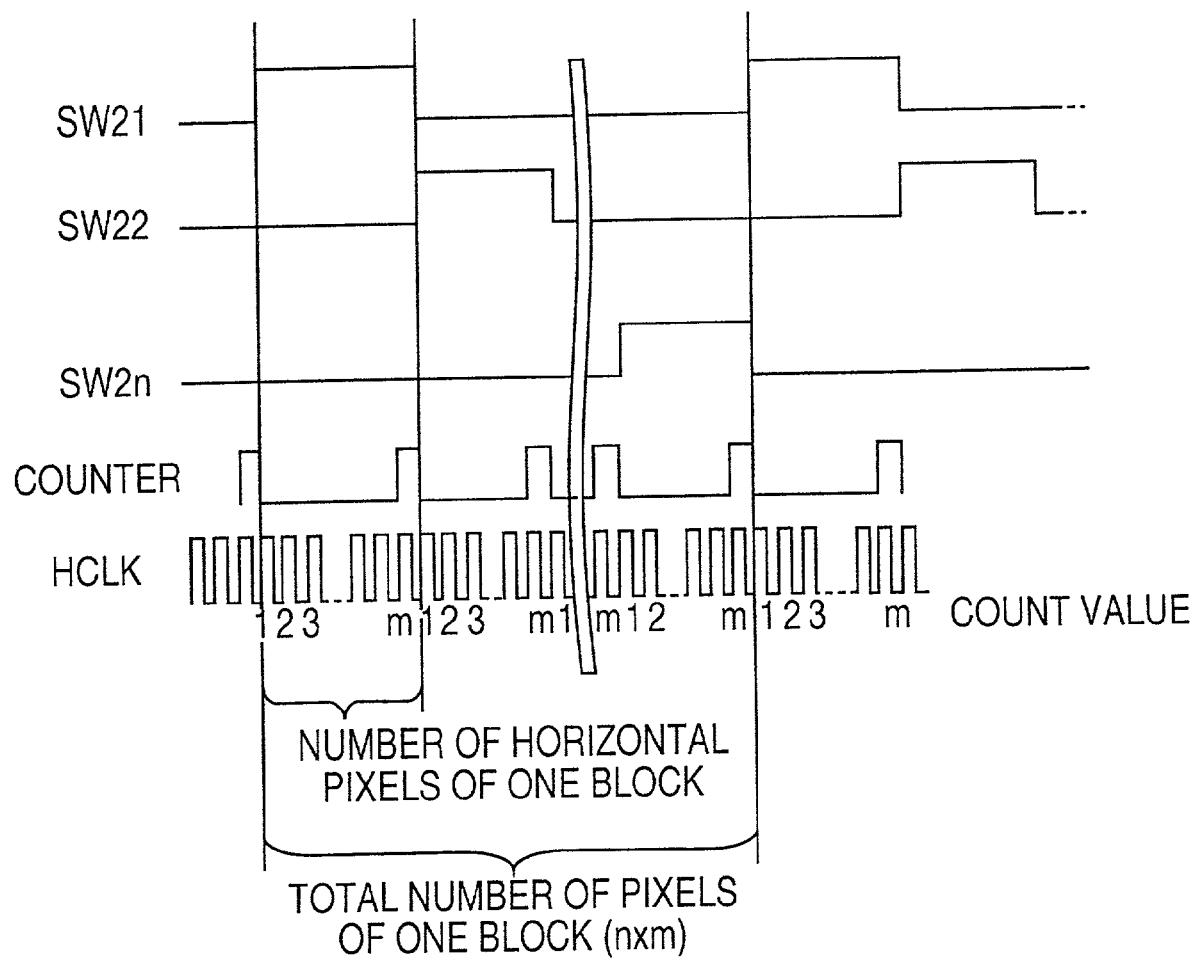
FIG. 12 is a diagram of a timing chart for the horizontal direction transfer period.

FIG. 12 is a timing chart of the operations during the transfer period in the horizontal direction for the second switch circuit 102 and second switch control circuit 106 of FIG. 9. When the counter 130 provides the first enable signal, the flip-flop F21, initialized with the signal "1", outputs a "1" for the control signal SW21. The other flip-flop circuits, initialized with the signal "0", output a "0" for the control signal SW22 to the control signal SW2n. Therefore, the switch S21 turns ON to output the image data of the first line buffer 120 to the external circuit.

Each flop-flop receives the signal output from the preceding flip-flop. Thereafter, the counter 130 is reset and does not provide the enable signal to the flip-flops until the horizontal direction pulse signal is counted for m times.

When the counter 130 provides the second enable signal, the flip-flop F22, having received the output signal "1" from the flip-flop F21, outputs a "1" for the control signal SW22. The other flip-flop circuits, having received the output signal "0" from the flip-flop in the preceding stage, output a "0" for the control signal SW21 and the control signal SW23 to the control signal SW2n. Therefore, the switch S22 turns ON to output the image data of the second line buffer 122 to the external circuit.

Each flip-flop again receives the signal output from the preceding flip-flop. Thereafter, the counter 130 is reset and does not supply the enable signal to the flip-flops until the horizontal direction shift pulse $H_{CLK}$ is counted m times. When the counter 130 provides the third enable signal, a third switch turns ON to output the image data of the third line buffer 124 to the external circuit.

The operations above are repeated until the image data of the line buffers are completely output to the external circuit. Thereafter, the period to transfer the image data to the line buffers in the vertical direction from the vertical CCD 32 begins. During the vertical transfer period, the horizontal shift pulses $H_{CLK}$ are not present.

According to the first embodiment of the present invention illustrated in FIG. 7, the image data are sequentially output in units of m pixels from the n line buffers holding the image data. In other words, the image data are output from the CCD 4 in the form obtained by dividing one frame into units of blocks of n×m pixels. Therefore, the output image data may be provided to the image data encoder 10 without being rearranged.

Figure 13:
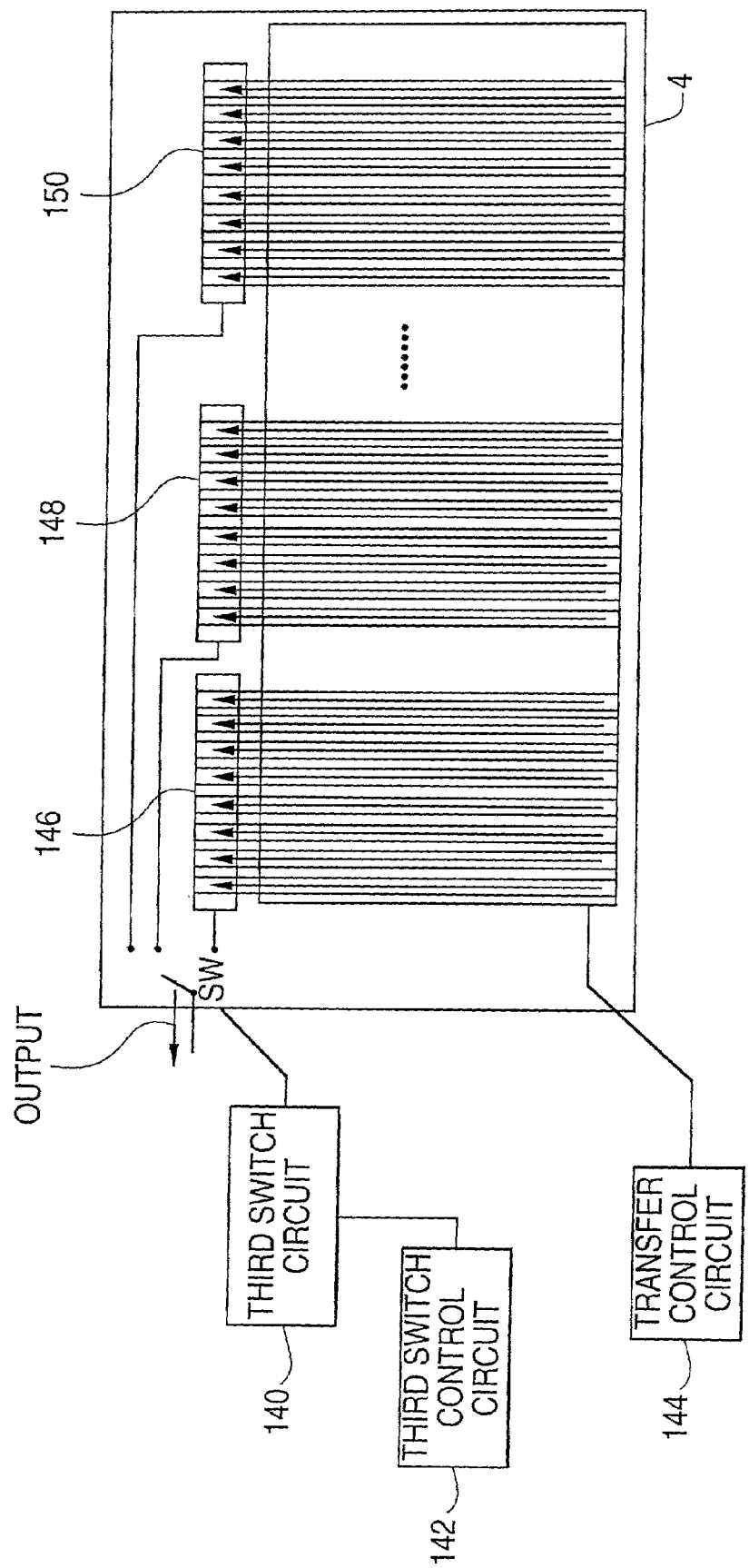
FIG. 13 is a diagram of a second embodiment of the present invention.

FIG. 13 is a diagram of a second embodiment of the present invention. The CCD 4 illustrated in FIG. 13 comprises, like the CCD 4 illustrated in FIG. 2, a horizontal CCD 30 and a vertical CCD 32. However, the horizontal CCD 30 illustrated in FIG. 13 divides a single line into a plurality of sections and comprises a number of buffers equal to the number of line sections. That is, where the image data are encoded in the image data encoder 10 in blocks of n×m (vertical×horizontal) pixels, the number of buffers (hereinafter, "buffer number" or "k") is determined by dividing the number of pixels in a horizontal line by m. Here, one buffer is capable of storing the image data corresponding to m pixels.

The CCD 4 illustrated in FIG. 13 also comprises a third switch circuit 140, a third switch control circuit 142, and a transfer control circuit 144. The third switch control circuit 142 controls the third switch circuit 140 to connect only one of the plurality of buffers of the horizontal CCD 30 and an external circuit (not illustrated). The transfer control circuit 144 controls the vertical CCD 32 to provide the image data to the buffers connected to the external circuit.

Operations for outputting the image data of the CCD 4 shown in FIG. 13 are explained below. The third switch control circuit 142 controls the third switch circuit 140 to connect the first buffer 146 and the external circuit. The transfer control circuit 144 controls the vertical CCD 32 to transfer the image data corresponding to the first buffer 146, that is, the image data of the first m pixels of the first horizontal line. The first buffer 146 outputs the image data to the external circuit. Next, the image data of the first m pixels of the second horizontal line are transferred to the first buffer 146 from the vertical CCD 32 and the first buffer 146 outputs the transferred image data to the external circuit. This process is repeated n times. Selection of the buffer and the vertical and horizontal transfers are repeated m times.

The third switch circuit 140 and the third switch control circuit 142 have circuit structures that are almost identical to the second switch circuit 102 and the second switch control circuit 106 of FIG. 11. The counter 160 of the third switch control circuit 142 counts the number of horizontal shift pulses $H_{CLK}$ (up to m pulses) and supplies the pulse signals to the flip-flops.

Figure 14:
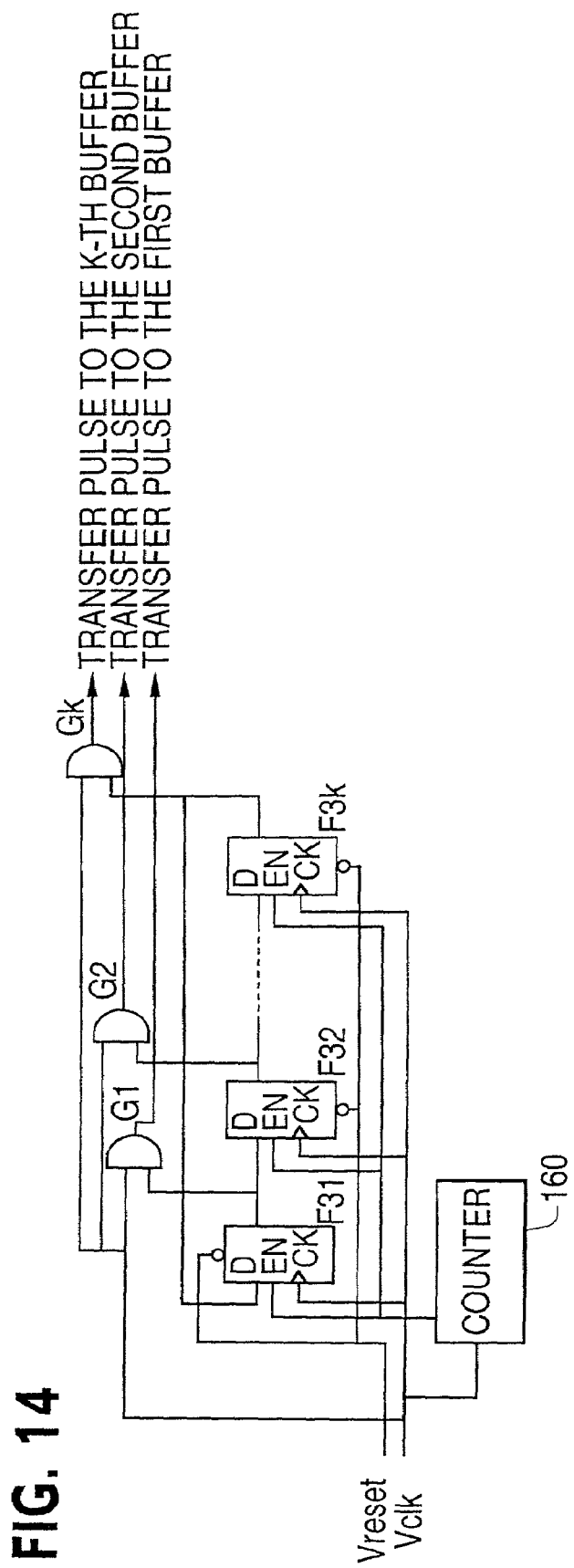
FIG. 14 is a diagram of a transfer control circuit.

FIG. 14 is a circuit diagram of the transfer control circuit 144. The transfer control circuit 144 controls the vertical CCD 32 to supply the image data to the buffer connected to the external circuit. The transfer control circuit 144 comprises a shift register with a number of flip-flop circuits equal to the number of buffers k, a number of AND gates equal to the number of buffers k, and a counter 160.

A signal output from each flip-flop circuit is provided to an input of a corresponding AND gate. A vertical shift pulse $V_{CLK}$ is also input to each AND gate. For example, the first AND gate G1 receives a signal output from the first flip-flop F31, and an output signal from the AND gate G1 controls transfer of the image data to the first buffer 146. An output of the second AND gate G2, which received an output from the second flip-flop F32, controls transfer of image data to the second buffer 148. An output of the kth AND gate Gk, which received an output from the flip-flop F3k, controls transfer of the image data to the kth buffer 150.

The reset signal $V_{reset}$ is supplied to the flip-flop F3k from the flip-flop F31 for initialization. The flip-flop F31 is initialized with the signal "1" and the other flip-flop circuits are initialized with the signal "0". Also, the enable signal EN of the counter 160 is input to the flip-flop F3k from the flip-flop F31. The counter 160 counts the number of vertical direction shift pulses $V_{CLK}$ (up to n times) and supplies the enable signal EN to the flip-flop F3k beginning with the flip-flop F31.

Figure 15:
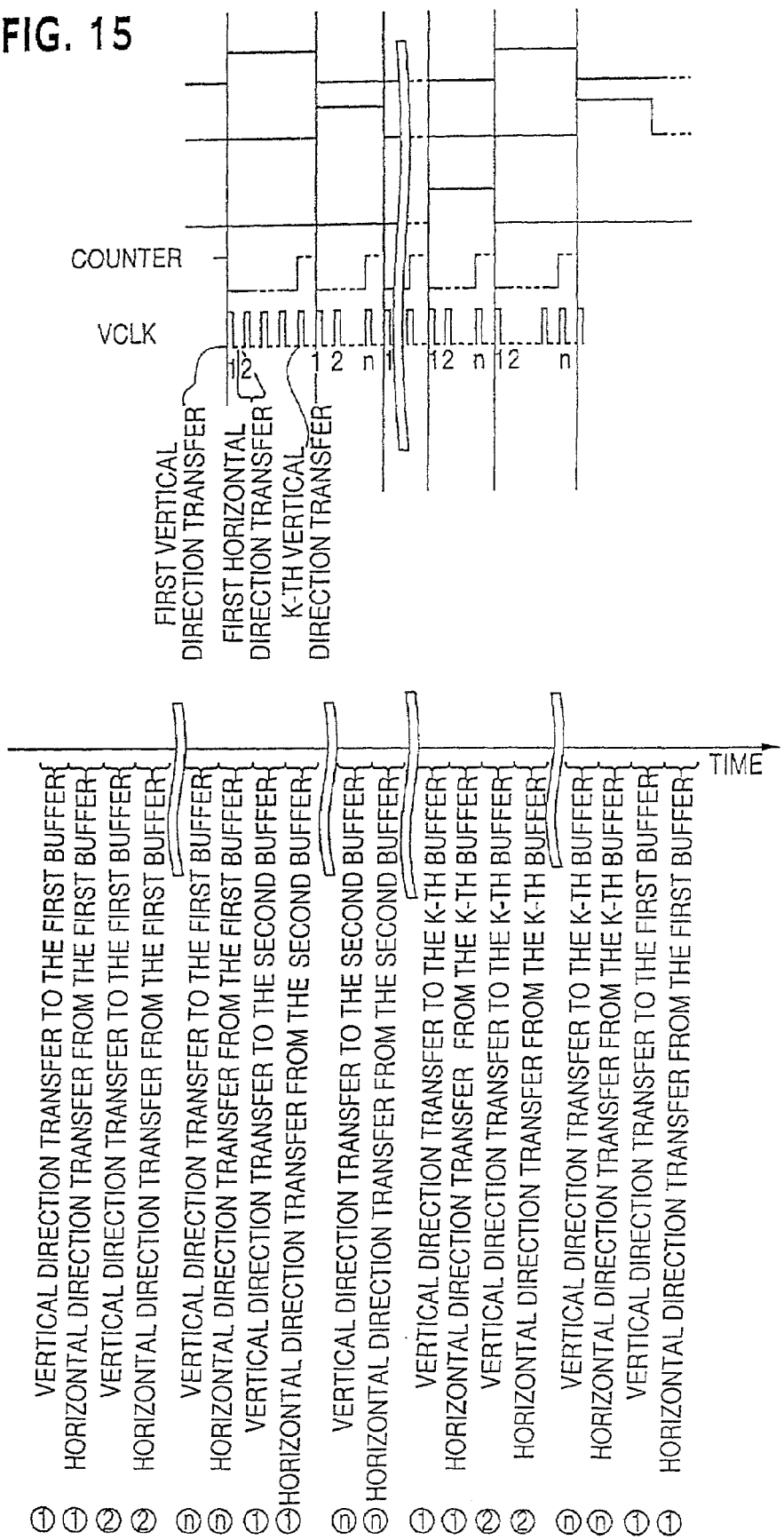
FIG. 15 is a diagram of another timing chart for the vertical direction transfer period.

FIG. 15 is a timing chart of the operation of the transfer control circuit 144 of FIG. 14, that is, the transfer in the vertical and horizontal directions. When the counter 160 provides the first enable signal, the flip-flop F31, initialized with the signal "1", outputs the signal "1". The other flip-flop circuits, initialized with the signal "0", output the control signal "0". The signal "1" output from the flip-flop F31 is then input to the AND gate G1. The other flip-flop circuits provide the signal "0" to one input of a corresponding AND gate. Therefore, only the AND gate G1 corresponding to the flip-flop F31 outputs the transfer pulse to the first buffer 146, and an output of each AND gate corresponding to the other flip-flop circuits, that is, the transfer pulses from the second buffers are not considered objects to the transfer operation.

The first buffer 146 performs the transfer operation based upon the vertical direction shift pulse $V_{CLK}$. When the vertical direction shift pulse $V_{CLK}$ is high, that is, when it is a "1", the image data are supplied to the first buffer 146 from the vertical CCD 32. When the vertical direction shift pulse $V_{CLK}$ is low, that is, when it is a "0", the m-pixel image data are supplied to the external circuit from the first buffer 146. Transfer of the image data to the first buffer 146 and output of the image data to the external circuit occur n times. In other words, the input and output of m pixels to and from the first buffer 146 is repeated a total of n times.

On the basis of the first enable signal from the counter 160, each flip-flop receives the signal output from the preceding flip-flop. Thereafter, the counter 160 is reset and the first enable signal is not generated for the flip-flops until the vertical direction shift pulse $V_{CLK}$ is counted n times.

When the counter provides the second enable signal, the flip-flop F32 receives the output signal "1" from the flip-flop F31 outputs the signal "1". The other flip-flop circuits receive the output signal "0" from the flip-flop in the preceding stage and output the signal "0". Therefore, only the output of the AND gate G2 corresponding to the flip-flop F32 outputs the transfer pulse to the second buffer 148, and the output of each AND gate corresponding to the other flip-flop circuits is fixed to "0". Therefore, the transfer operation is performed only on the second buffer 148, and the transfer operation is not performed on any other buffers until the counter 160 outputs the third enable signal. Input and output of m pixels to and from the second buffer 148 is repeated a total of n times. When the counter 160 provides the third enable signal, the transfer operation is performed on the third buffer and so forth. These processes are repeated for each of the k buffers. Input and output of m pixels to and from the kth buffer is repeated a total of n times.

According to the second embodiment of the present invention shown in FIG. 13, up to n lines of image data may be sequentially output from each buffer holding image data of m pixels. That is, the image data are output from the CCD 4 in the units of blocks of n×m pixels of one frame. Therefore, the image data are supplied to the image data encoder 10 without needing to be rearranged.

Figure 16:
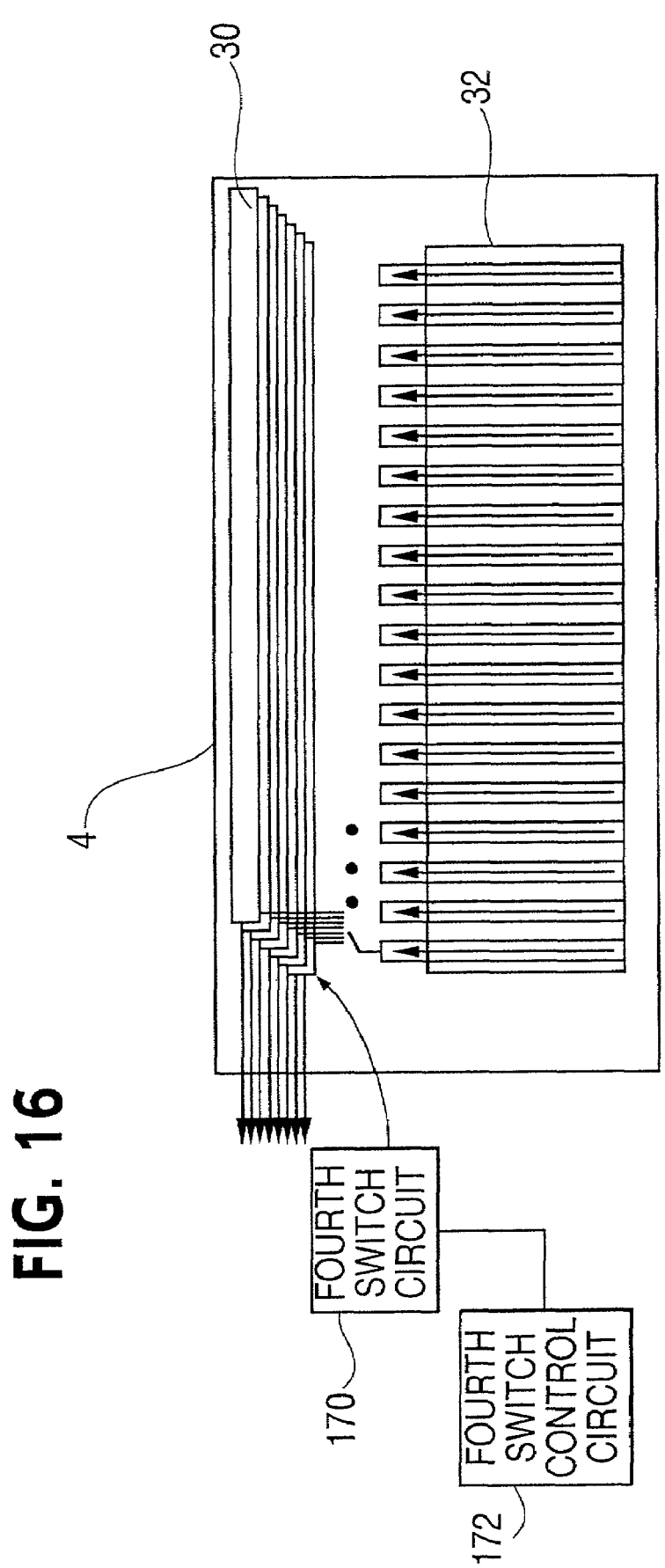
FIG. 16 is a diagram of a third embodiment of the present invention.

FIG. 16 is a diagram of a third embodiment of the present invention. The CCD 4 illustrated in FIG. 16 comprises, like the CCD 4 illustrated in FIG. 2, a horizontal CCD 30 and a vertical CCD 32. However, the horizontal CCD 30 illustrated in FIG. 16 has as many line buffers as the number of lines required for the image data encoding process. That is, n line buffers are provided when encoding image data in the image data encoder 10 in blocks of n×m pixels.

The CCD 4 illustrated in FIG. 16 also comprises a fourth switch circuit 170 and a fourth switch control circuit 172. The fourth switch control circuit 172 controls the fourth switch circuit 170 so that only one of the plurality of line buffers of the horizontal CCD 30 connects to the vertical CCD 32.

The image data output operation of the CCD 4 illustrated in FIG. 16 is explained below. The fourth switch control circuit 172 controls the fourth switch circuit 170 to connect the first line buffer and the vertical CCD 32. The image data of one horizontal line are transferred to the first line buffer in the vertical direction from the vertical CCD 32. Next, the fourth switch control circuit 172 controls the fourth switch circuit 170 to connect the second line buffer and the vertical CCD 32. The image data of one horizontal line are transferred to the second line buffer from the vertical CCD 32. As explained above, the fourth switch control circuit 172 switches connections of the fourth switch circuit 170 to fill all line buffers with the image data.

Transfer in the horizontal direction is then performed after the image data are completely transferred to all of the n line buffers. The image data in the n line bluffers are output in parallel from the n line buffers. The transfer in the vertical direction and the transfer in the horizontal direction are repeated until the image data of one frame are completely output.

The fourth switch circuit 170 and the fourth switch control circuit 172 have the same circuit structures as the first switch circuit 100 and the first switch control circuit 104 of FIG. 9.

According to the third embodiment of the present invention shown in FIG. 16, the n lines of image data are output from the CCD 4 in parallel from the n line buffers holding the image data in units of n×m pixels of one frame. In other words, the image data are output from the CCD 4 in units of n×m pixels until a plurality of n×m pixels yields one frame Therefore, the image data may be transferred to the image data encoder 10 without rearranging the output image data.

In the third embodiment of the present invention, because the image data are output in parallel from the CCD 4, the image data encoder 10 is capable of inputting the image data in parallel. The image data encoder 10 can directly execute encoding for the parallel image data, but it can also execute ordinary encoding by converting the parallel image data to serial data. In the former case, the data transfer rate to the image data encoder 10 from the CCD 4 may be increased and the encoding rate in the image data encoder 10 may also be improved. Accordingly, a high speed image processor may be realized.

The many features and advantages of the invention are apparent from the detailed specification and, thus, it is intended by the appended claims to cover all such features and advantages of the invention which fall within the true spirit and scope of the invention. Further, because numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A charge-coupled device (CCD), comprising:
   a vertical CCD having a plurality of photosensors arranged in v vertical lines and n horizontal lines corresponding to an n×v frame of pixels, and converting optical signals to electrical signal image data, the plurality of photosensors arranged in v×h (vertical× horizontal) matrix;
   a horizontal CCD having n line buffers, each buffer holding up to v pixels of image data, and the number of the plurality of line buffers arranged in the vertical direction is less than the number of photosensors arranged in the vertical direction;
   a first switch circuit connected to each of the vertical lines and the line buffers;
   a first switch control circuit controlling said first switch circuit so that each line buffer sequentially connects to said vertical CCD, the image data in sequential ones of the n horizontal lines of said vertical CCD being transferred to a corresponding one of the n line buffers;
   a second switch circuit connected to the line buffers and an external circuit; and
   a second switch control circuit controlling said second switch circuit so that each line buffer sequentially connects to the external circuit, the image data in the line buffers being transferred to the external circuit in blocks of n×m (m<v) pixels, each line buffer in each block transferring m pixels.

2. A charge-coupled device (CCD), comprising:
   a vertical CCD having a plurality of photosensors arranged in v vertical lines and n horizontal lines corresponding to an n×v frame of pixels, and converting optical signals to electrical signal image data, the plurality of photosensors arranged in v×h (vertical× horizontal) matrix;
   a horizontal CCD having n line buffers, each buffer holding up to v pixels of image data, and the number of the plurality of line buffers arranged in the vertical direction is less than the number of photosensors arranged in the vertical direction;
   a switch circuit connected to each of the vertical lines and the line buffers; and
   a switch control circuit controlling said switch circuit so that each line buffer sequentially connects to said vertical CCD, the image data in sequential ones of the n horizontal lines of said vertical CCD being transferred to a corresponding one of the n line buffers, and the image data in the n line buffers being output in parallel to the external circuit.

3. A charge-coupled device (CCD), comprising:
   an array of photosensors arranged in v vertical lines and n horizontal lines corresponding to an n×v pixel array of image data, the array of photosensors arranged in v×h (vertical×horizontal) matrix; and
   a plurality of n line buffers, each line buffer holding up to v pixels of image data, and the number of the plurality of line buffers arranged in the vertical direction is less than the number of photosensors arranged in the vertical direction,
   wherein each line buffer sequentially connecting to said array, the image data in sequential ones of the n horizontal lines of said array being transferred to a corresponding one of the n line buffers, and each line buffer sequentially outputting the image data, the image data in the line buffers being output in blocks of n×m (m<v) pixels, each line buffer in each block outputting m pixels.

4. A charge-coupled device (CCD), comprising:
   an array of photosensors arranged in v vertical lines and horizontal lines corresponding to an n×v pixel array of image data, each horizontal line being divided into k line sections, each line section corresponding to m (m<k) pixels of image data, and the array of photosensors arranged in v×h (vertical×horizontal) matrix; and
   a plurality of k line buffers, each line buffer holding up to m pixels of image data, and the number of the plurality of line buffers arranged in the vertical direction is a value which is more than 1 and less than v, each of the plurality of line buffers stores h electrical signals,
   wherein blocks of n×m pixels of image data are transferred from the array of photosensors to the line buffers, such that a first one of the buffers receives m pixels from a horizontal line and outputs the m pixels before receiving another m pixels from the next horizontal line and so forth until a first block of n×m pixels has been transferred and output, and repeating the transfer and output operations for each remaining line buffer and the remaining image data.

5. A charge-coupled device (CCD), comprising:
- an array of photosensors arranged in v vertical lines and n horizontal lines corresponding to an n×v pixel array of image data, and the array of photosensors arranged in v×h (vertical×horizontal) matrix; and
- a plurality of n line buffers, each line buffer holding up to v pixels of image data, and the number of the plurality of line buffers arranged in the vertical direction is less than the number of photosensors arranged in the vertical direction,
- wherein each line buffer sequentially connecting to said array, the image data in sequential ones of the n horizontal lines of said array being transferred to a corresponding one of the n line buffers, the image data in the n line buffers being output in parallel.

6. A method of outputting image data from a charge-coupled device (CCD), comprising:
- arranging a plurality of photosensors in v vertical lines and n horizontal lines corresponding to an n×v pixel array of image data, the plurality of photosensors arranged in v×h (vertical×horizontal) matrix;
- connecting, sequentially, each one of a plurality of n line buffers to the array of photo sensors, each line buffer holding up to v pixels of image data, and transferring the image data in sequential ones of the n horizontal lines of the array to a corresponding one of the n line buffers, the number of the plurality of line buffers arranged in the vertical direction is less than the number of photosensors arranged in the vertical direction; and
- outputting, sequentially, the image data of each line buffer, the image data in the line buffers being output in blocks of n×m (m<v) pixels, each line buffer in each block outputting m pixels.

7. A method of outputting image data from a charge-coupled device (CCD), comprising:
- arranging a plurality of photosensors in v vertical lines and n horizontal lines corresponding to an n×v pixel array of image data;
- dividing each horizontal line into k line sections, each line section corresponding to m (m <k) pixels of image data;
- transferring blocks of n×m pixels of image data from the array of photosensors to a plurality of k line buffers, each line buffer holding up to m pixels of image data, such that a first one of the buffers receives m pixels from a horizontal line and outputs the m pixels before receiving another m pixels from the next horizontal line and so forth until a first block of n×m pixels has been transferred and output, and repeating the transfer and output operations for each remaining line buffer and the remaining image data,
- wherein the plurality of line buffers is arranged in a vertical direction and is a value which is more than 1 and less than v, each of the plurality of line buffers stores h electrical signals.

8. A method of outputting image data from a charge-coupled device (CCD), comprising:
- arranging a plurality of photosensors in v vertical lines and n horizontal lines corresponding to an n×v pixel array of image data; and
- connecting, sequentially, each one of a plurality of n line buffers to the array of photo sensors, each line buffer holding up to v pixels of image data, and transferring the image data in sequential ones of the n horizontal lines of the array to a corresponding one of the n line buffers, and outputting the image data in the n line buffers in parallel,
- wherein the plurality of line buffers is arranged in a vertical direction and is less than the number of the photosensors arranged in the vertical direction.

* * * * *

UNITED STATES PATENT AND TRADEMARK OFFICE
CERTIFICATE OF CORRECTION

| | | |
|---|---|---|
| PATENT NO. | : 7,301,574 B2 | Page 1 of 1 |
| APPLICATION NO. | : 09/775639 | |
| DATED | : November 27, 2007 | |
| INVENTOR(S) | : Yoshimasa Ogawa | |

It is certified that error appears in the above-identified patent and that said Letters Patent is hereby corrected as shown below:

Title page, Column 1 (Title), item [54] Line 1, change "CHARGE COUPLED" to --CHARGE-COUPLED--.

Column 1, Line 1, change "CHARGE COUPLED" to --CHARGE-COUPLED--.

Column 12, Line 2, change "(m <k)" to --(m<k)--.

Signed and Sealed this

Sixth Day of May, 2008

JON W. DUDAS
*Director of the United States Patent and Trademark Office*